United States Patent [19]

Michelet et al.

[11] Patent Number: 4,982,411
[45] Date of Patent: * Jan. 1, 1991

[54] WALL ELECTRODE FOR DIRECT CURRENT POWERED ELECTRIC ARC FURNACE

[75] Inventors: Jacques Michelet, Longeville-les-Metz; Ghislain Maurer, Metz, both of France

[73] Assignee: IRSID, Maizieres-les-Metz, France

[*] Notice: The portion of the term of this patent subsequent to Aug. 4, 2004 has been disclaimed.

[21] Appl. No.: 795,555

[22] Filed: Nov. 6, 1985

[51] Int. Cl.$^5$ .............................. H05B 7/00
[52] U.S. Cl. ........................ 373/72; 373/108
[58] Field of Search ............ 373/36, 37, 38, 72, 373/108, 88, 71, 120, 48, 55, 93

[56] References Cited
U.S. PATENT DOCUMENTS
4,685,112 8/1987 Michelet et al. ............... 373/72

Primary Examiner—Roy N. Envall Jr.
Attorney, Agent, or Firm—Pollock, Vande Sande & Priddy

[57] ABSTRACT

A wall electrode for a D.C. powered electric arc furnace for the processing of metals in a liquid state, especially steel. The electrode is constituted mainly (a) by a metallic bar (4) one of whose ends comes into contact with the metallic bath (6), while a portion (7) of its other end extends to the exterior of the furnace; (b) by a sleeve (8) of thermally and electrically conductive material, energy-cooled by a flow of cooling fluid, surrounding the portion (7) of the other end of the bar at a distance therefrom; (c) by a nipple (9) of good electrically conductive material extending the aforementioned portion (7) of the other end of the bar; and (d) by a connection of the nipple and the sleeve to the same bar of an electrical supply. The invention takes into account the effects of differential expansion between the cold sleeve (8) and the alternately warm and cold bar (4), and permits a good thermal exchange and a good electrical contact between bar and sleeve to be maintained during repeated sequences of resmelting and resolidification of the bar.

7 Claims, 1 Drawing Sheet

WALL ELECTRODE FOR DIRECT CURRENT POWERED ELECTRIC ARC FURNACE

FIELD OF THE INVENTION

This invention pertains to a wall electrode for a direct current powered electric arc furnace for the processing of metals in the liquid state, especially steel.

Electrodes of this type are electrical connection devices installed through the wall of the furnace (generally through the bottom) so as to come, at one end, into contact with the molten metal mass contained in the furnace, with the other end being connected to a terminal of a direct current electricity supply. The other electricity supply terminal is conventionally connected to one or several mobile electrodes made of graphite, placed a short distance above the metallic bath to create and maintain between them and the surface of the bath, electric arcs which bring the thermal energy which is necessary for the processing of the metal.

The wall electrodes considered here can be implemented in iron and steel metallurgy, notably in the treatment or temperature maintenance ladles (ladle bottom electrodes) or, more generally, in arc melting furnaces (hearth electrode).

BACKGROUND OF THE INVENTION

It is known that one of the essential problems encountered in this area concerns the proper tolerance of the hearth electrode over time.

This, in fact, is exposed to very severe thermal conditions due at once to the presence of molten metal in the furnace, whose temperature can reach, even exceed, 1800 degrees C., and an internal heating by the joule effect due to very high intensities of the electrical current which passes through it and which, for example, in arc melting furnaces, are about 30,000 amperes.

A solution, recently presented by the applicant in French Patent Application no. 84.10482 of June 27, 1984 consists of making a hearth electrode for an arc furnace from a steel bar going out of the furnace by an end portion covered with a copper sleeve, energy-cooled by a circulation of water and connected to an electricity supply terminal. The application of the sleeve to the circumference of the bar ensures the desired thermal and electrical contacts. As a variation, a nipple made of heat-resistant material extends the external portion of the bar and works with the end of the sleeve to eliminate any risk of the escape of molten metal in case, following possible trouble in cooling, the cone-shaped melting of the central zone of the bar proceeds up to its end.

This electrode gives full satisfaction in periods of operation of the furnace from medium and long durations. Nonetheless, over very long periods of time, it can be feared that, after repetitive sequences of remelting and resolidification of the bar, the effects of differential expansion between the cooled sleeve and the alternately hot and cold bar progressively lead to a deterioration of the quality of the electrical contact between the bar and the sleeve, and even the thermal exchange between these.

OBJECT OF THE INVENTION

The purpose of this invention is to propose a new assembly of this type of electrode which overcomes the aforementioned disadvantages.

SUMMARY OF THE INVENTION

For this purpose, the invention comprises a wall electrode for D.C. powered electric arc furnaces, of the type which include a metal bar which passes through the wall of the furnace so as to come, at one end, into contact with a molten metal mass contained in the furnace, the other end passing out of the furnace by an end portion covered with a sleeve made of thermal and electrically-conductive material, for example, of copper, energy-cooled by a circulation of cooling fluid, notably water, and connected to the electricity supply terminal, and a nipple extending the portion of the bar passing out of the furnace, the electrode being characterized in that:

the sleeve surrounds the portion of the bar which goes out of the furnace so as to form, upon assembly, a separation space between them;

the nipple is made of a material which is a good conductor of electricity and means are provided to connect this nipple to the same electricity supply terminal as the sleeve.

In accordance with a preferred embodiment, the nipple is also made of a good heat conducting material, for example, copper, as the sleeve and is energy-cooled by a circulation of cooling fluid, notably water.

Thus, one is certain that the nipple cannot become worn, because it can never be placed in contact with the melting metal, even in case of pronounced melting of the bar due to a possible breakdown in the cooling of the sleeve.

In accordance with another embodiment, the bar in the nipple which is connected to it are slidingly mounted longitudinally in the sleeve, with a stop abutment attached to the furnace provided at the base of the nipple to prevent the bar from coming out of the sleeve, possibly under the effect of its own weight when the electrode is placed vertically across the bottom of the furnace.

This preferred embodiment takes into account phenomena of longitudinal retraction of the bar during its periodic resolidifications which can take place without causing repeated mechanical stresses on the various assembled elements comprising the electrode.

In this embodiment, a sliding electrical contact is advantageously formed between the nipple and a fixed part of the electrode connected to the electricity supply terminal. This fixed part can, moreover, be formed by the lower part of the sleeve itself, which is beyond the end of the bar, or by another piece, for example, a base plate attached under the sleeve, thus ensuring the electrical connection sought with the latter and presenting an opening which is calibrated for the passage of the nipple, the sliding electrical current then operating at the level of this opening.

As will be understood, the basic idea of the invention consists of separating, by construction, the bar from the sleeve which surrounds it, and hence, the nipple at the end of the bar, initially provided for reasons of safety, is made of good electricity conducting material to ensure an electrical contact with the bar at the its end.

The preceding describes the "cold" situation, i.e. when the electrode is out of use, either before the first startup of the furnace with new electrode, or in periods when operations are shut down between successive melting periods.

On the other hand, in "hot" situation, when the furnace is supplied with voltage, a startup phase takes place, during which the bar heats up to the melting of its upper, uncooled part, buried in the refractory of the furnace wall. At the same time, the cold space placed between the sleeve and the bar rapidly fills up with metal coming from the bar, either due to its radial expansion during its temperature ascension, or due to the flow of the molten metal to the upper part, or, according to these two processes, the exact mechanism for the filling of the space being not yet perfectly explained.

But this is of little importance, since the sleeve, being vigorously cooled, can only come into its contact (and consequently in the existing "cold" separation space) only with solid, origin or resolidified metal.

The electrical contact between the sleeve and the bar is thus constituted. Henceforth, the electrical current, which tends to choose path of least resistance, will preferentially pass through the sleeve rather than through the nipple. The passage of the current in the bar then occurs laterally, through the sleeve.

After each melting, the operator opens the electrical current before draining the furnace. The bar then cools and by radial contraction, again forms the separation space with the sleeve awaiting the next startup for a new melting in the furnace.

BRIEF DESCRIPTION OF THE DRAWINGS

The invention will be better understood and other aspects and advantages will emerge more clearly from the following description, given as a non-limitative example with reference to the attached drawing in which.

DETAILED DESCRIPTION

Figure 1:
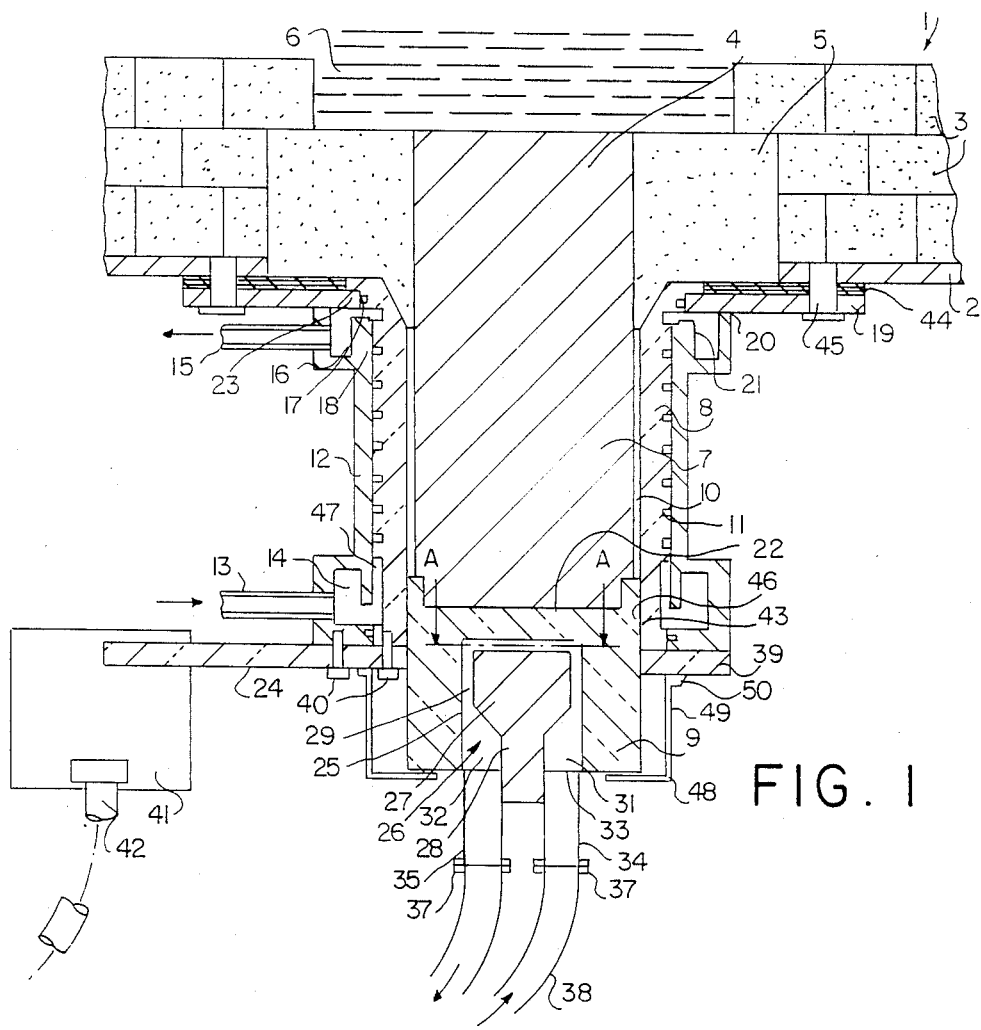
FIG. 1 shows, in partial longitudinal section, the hearth of a D.C. powered electric arc furnace equipped with an electrode according to the invention.

The assembly shown in FIG. 1 illustrates the central part of the bottom 1 of a D.C. arc furnace which is principally formed of a metal shell 2 lined on the inside with bricks 3 made of refractory material. A free passage is provided in the center of the furnace base to permit the installation of a round steel billet 4, 250 mm in diameter, which, in this example, constitutes the metal bar of the hearth electrode. The free space left between the upper part of the billet 4 and the bricks 3 is conventionally filled with tamped magnesia 5. The upper end of the billet 4 is thus in contact with the molten metal 6 which, here, is steel. Preferably, and as shown in the drawing, a recess is provided in the center of the bottom 1 of the furnace, to promote the formation of a hot heel of the bath just above the upper end of the billet 4.

On the opposite side, the billet 4 crosses the shell 2 of the furnace so that it presents an end portion 7 outside of the furnace.

According to the invention, the portion 7 of the billet is covered laterally by the sleeve 8 and prolonged at its lower end by a nipple 9.

In addition, in this example, the billet 4, which is made of steel, as well as the sleeve 8 and the nipple 9 are of circular section.

The sleeve 8, made of copper due to its good heat and electricity conducting properties, is mounted around, and at a short distance from, the part 7 of the billet, so as to form a space 10 between them, which will be filled during the application of voltage to the furnace 1 when the billet will be brought to high temperatures during the melting of the metal bath 6. Thus, in this example, an annular space 10 having a width of 1.25 mm, is provided around the steel billet 4, whose diameter is 250 mm, which allows a narrow contact to be achieved between the sleeve 8 and the billet 4 as soon as the latter reaches approximately 700-750 degrees C.

With respect to the width of this space 10, it must be understood that, strictly speaking, there is no required upper limit value, because the available volume will be filled anyway during the first melting of the bar 4.

On the other hand, there is a lower limit value, which can be determined in each case, depending on the nature and the diameter of the bar 4, taking into account the radial thermal expansion of the bar between the ambient temperature and the temperature at which the metal forming the bar 4 loses its rigidity and can be relatively easily reshaped.

If the width of the space 10 is too small, its filling by the radial expansion of the bar 4 will be achieved while this bar still has a good rigidity such that there is a risk of mechanical stresses on the sleeve which can impede the proper behavior of the electrode.

As indicated above, in the case of a round 4 steel bar, 250 mm in diameter, a space 10 of 1.25 mm is provided, which will be filled by thermal expansion during the first actuation of the furnace, around 700-750 degrees C., i.e., at a temperature at which the steel forming the bar can already be deformed under the effect of its own pressure which it exerts on the copper sleeve 8, (which preferably is between 2 and 5 cm thick).

In addition, the sleeve 8 has eight channels 11 tooled in its external lateral surface, which, here, are helicoidal and parallel to each other, each channel 11, on the whole, making one laparound the sleeve 8.

To ensure the watertight closing of the channels 11, a jacket 12, made of steel in this example, is applied to the sleeve 8.

Means of entry and exit for a cooling fluid, here, demineralized water, are provided in the metal jacket 12 to supply the channels 11. In the example presented in FIG. 1, these means are constituted, in the lower part of the jacket 12, of an inlet 13 extending into an annular chamber 14, and, on the upper part of the jacket 12, of an outlet 15 leaving the annular chamber 16. In addition, the channels 11 are each connected at their ends to these two chambers 14 and 16. Thus, their lower end opens into the chamber 14 and their upper end is connected to the outlet chamber 16 through horizontal passages 17 arched in the direction of rotating movement of the water in the channels 11.

As can be seen in FIG. 1, the passages 17 are placed on the frontal surface of a thickened diameter portion 18 of the jacket 12 at its upper part. The closing of the passages 17 is effectuated by the positioning of the jacket 12 against a base plate 19 (which will be described below), and a welded band 20 ensures the assembly of these two components.

To facilitate the communication of the channels 11 with the passages 17, an annular groove 21 is advantageously provided at the end of the sleeve, for collecting the water leaving the channels 11.

Moreover, the annular chamber 14 has an annular distributor 47, with more or less the same depth as the channels 11, and which is placed on the lateral surface of the sleeve 8. Thus, the cooling fluid is advantageously accelerated in the distributor 47 before entering the channels 11.

The watertightness of the sleeve-jacket assembly is ensured by annular seals 23 and 24, placed respectively at the upper and lower ends of the sleeve 8.

The nipple 9, like the sleeve, is made of copper, due to its good electrical and thermal conducting properties.

The nipple 9 is attached to the lower end of the billet 4, preferably by screwing. As can be seen in FIG. 1, the lower end of the billet has a narrower portion introduced in a corresponding cylindrical recess 22 on the surface of the nipple 9. This end of the billet 4 as well as the recess 22 have, respectively, on their internal and external lateral surface, a threading (not shown) which allows their assembly by screwing. Preferably, a square threading is chosen, which ensures a significant contact surface between the lower end of the billet and the nipple, and, thus improves the electrical contact between them.

In addition, the nipple 9 is is hollowed out to form a substantially cylindrical cavity 25, open at its lower end, through which its cooling is achieved by water circulation.

For this purpose, a steel core 26 is lodged in the cavity 25. This metal core presents the special characteristic of being constituted of two adjacent parts, a cylindrical upper part 27, having a section more or less equal to that of the cavity, and a lower part 28, having, on its cylindrical surface, which has the same diameter as the part 27, two flat components, parallel to each other, clearly visible in FIG. 1. In addition, the part 27 has, on its external surface, lateral and frontal, channels 29, parallel to each other, each of them in a general "U" shape around the part 27.

Figure 2:
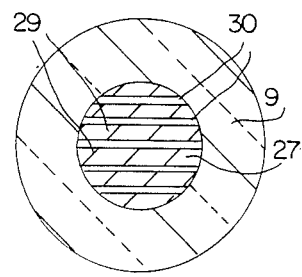
FIG. 2 shows a transverse section of the nipple extending the terminal of the electrode, along line A—A of FIG. 1.

FIG. 2 more clearly illustrates the path of each channel 29. On the frontal surface of the part 27, channels 29 form a rectilinear and parallel network which runs on both sides, on the lateral surface of the part 27, in a vertical direction. The notches 30, shown in FIG. 2, correspond to the section of the vertical part of the channels 29.

As can be seen in FIG. 2, the closing of the channels 29 is effected during the mounting of the core 26 inside the cavity 25 by the simple coming into contact of this component against the cavity walls.

Again referring to FIG. 1, it can be seen that the channels 29 open at their ends into two chambers 31 and 32, located on both sides of the part 28 of the core and arranged between the nipple 9 and the flat components of the lateral surface of the part 28.

The closing of the chambers 31 and 32 is ensured by means of a metal sheet 33, welded to the lower end of the nipple 9, and having three passages, one in the center, with the same section as the part 28 so as to allow the mounting of the plate 33 around this part, the two others being circular and each constituting the opening of the chambers 31 and 32 respectively.

Two rigid metal conduits 34 and 35 are welded against the plate 33 around these two openings to allow respectively the entry and exit of cooling water in the chambers 31 and 32. In addition, these two rigid conduits are extended by flexible connective piping 38, with the aid of clamps 37, this connective piping itself being connected to a demineralized water supply (not shown in this figure).

In this manner, a circulation of cooling water is established in the channels 29, thus allowing the effective cooling of the lower part of the billet 4 through the intermediary of the nipple 9.

With respect to the electrical connection of the billet 4, this connection includes a copper plate 39, with a circular opening for the free passage of the nipple 9. The attachment of the plate 39 against the lower end of the sleeve 8 is ensured by means of a screw 40.

The plate 39 is connected to one or several vertical fins 41, also made of copper, which are generally called "flags". Each flag 41 is connected to a copper cable 42, the latter being connected to an electrical supply terminal (not shown in the drawings). Due to the high intensities carried by the cables 42, the latter are preferably hollow to allow a circulation of cooling fluid, for example, water.

As will be understood, the plate 39, which establishes the electrical connection of the billet 4, is located in close contact with the sleeve 8 but not with the nipple 9. In fact, between the nipple 9 and the plate 39, there is a functional clearance maintained so that the nipple can easily slide within the sleeve.

According to the embodiment of the invention shown in FIG. 1, electrical contact means have thus been provided between the nipple 9 and the sleeve 8, these means being chosen for their ability to allow the sliding of the nipple in the sleeve. These means are advantageously comprised of an annular copper ferrule, made of "leaf spring" type elements, the ends of these elements being inserted into two grooves 46 provided in the internal surface of the sleeve 8. Thus, the flexible part of the ferrule 43 is in permanent elastic contact with the nipple 9.

The device according to the invention further comprises means of assembling the complex formed by the sleeve 8 and the jacket 12, under the shell 2 of the furnace and around the billet 4. In the example described, these means are first of all comprised of the base plate 19 attached to the shell 2 of the furnace by two screws 45 with the intercalation of an electrically insulating plate 44. To perfect the electrical insulation of the electrode according to the invention with respect to the furnace, the screws 45 are housed, in a conventional manner, in insulating tubes with flanges (not shown).

As stated above, a fixed stop abutment is provided under the nipple 9 to prevent the bar 4 from possibly coming out of the sleeve 8.

In FIG. 1, this abutment is comprised of a disc 48, with an opening in the middle for its mounting around rigid conduits 34 and 35 under the nipple 9.

The external diameter of the disc 48 is made to be greater than that of the nipple 9 so that it can have support arms 49 around its periphery, which are attached at their upper end to the plate 39 by means of a bolted flange 50.

Preferably, for safety reasons, the attachment of the support arms to the plate 39 is achieved by utilizing a conventional electrical insulation of the plate 39. For the same reasons, the side of the disc facing the nipple 9 is coated with electrically insulating material.

Of course, the invention is in no way limited to the embodiment described herein.

For example, the cooling of the end of the bar 4 can be achieved, through the rapid circulation of cooling fluid between the core 26 and the nipple 9, simply by providing a core 26 which is smaller than the interior of the cavity 25.

With respect to the electrical connection of the nipple 9, there are also different variants of the described structure.

Thus, several annular blades arranged with some above and others on the periphery of the nipple and establishing electrical contact between the sleeve and the nipple can be provided.

It is also possible to provide a sliding electrical contact between the nipple 9 and a fixed part of the electrode, other than the sleeve 8, and which would be connected to an electrical supply source.

Figure 3:
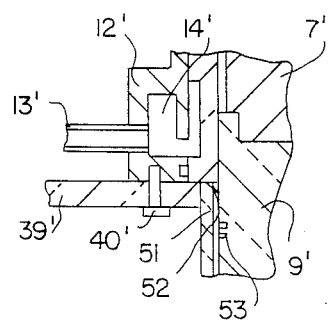
FIG. 3 illustrates a mode of electrical connection of the nipple by sliding contact different from that shown in FIG. 1.

A variant of this type of assembly is shown in FIG. 3. The fixed part of the electrode is formed by an annular part 51 which extends the sleeve 8 at its lower end and thus constitutes a ring which laterally surrounds the part 9' of the nipple projecting outside of the sleeve 8. The ring 51 is attached to the copper plate 39' by screwing.

Contrary to the embodiment according to FIG. 1, sliding electrical contacts 52, constituted of a copper annular flange formed of "leaf spring" type elements, are provided in elastic support against the internal lateral surface of the ring 51.

Two circular grooves 53 are thus arranged on the lateral surface of the nipple, in which the ends of the elements 52 are lodged.

Of course, it is also possible to provide the same sliding electrical contacts but in elastic support against the lateral surface of the nipple.

Finally, while the invention is used to greateSt effect for a hearth electrode for a continuous current arc furnace, it is also useful whenever a contact is sought between a molten mass and an electrode, or, more generally, a metal bar which must ensure the passage of electrical current.

What is claimed is:

1. Wall electrode for a direct current powered electric arc furnace of the type comprising a metallic bar passing through a wall of said furnace so as to contact by one of its ends a molten metal mass contained in said furnace, the other end of said bar extending to the exterior of said furnace by a portion of said other end surrounded by a sleeve of thermally conductive material, energy-cooled by a cooling fluid, and a nipple extending said end of said bar extending to the exterior of said furnace, wherein
    (a) said sleeve (8) surrounds said portion (7) of said bar (4) with a small spacing between them, so as to form a separation space (10) during mounting sufficient to accommodate thermal expansion of said bar in said sleeve; and
    (b) said nipple (9) is made of electrically conductive material, means (43) being provided for connecting said nipple to an electrical supply terminal.
2. Electrode according to claim 1, wherein said bar (4) and said nipple (9) are attached to one another and are slidingly mounted in said sleeve (8), and wherein and means for connecting said nipple to said electrical supply terminal comprise a sliding electrical contact (43).
3. Electrode according to claim 1, wherein said nipple (9) is also made of good heat conductive material and is energy-cooled by internal circulation of cooling fluid.
4. Electrode according to claim 1, wherein said nipple (9) is fixed by screwing to said other end of said bar.
5. Electrode according to claim 4, wherein said screwing is assured by rectangular threading.
6. Electrode according to claim 1, wherein a stop abutment (48) is provided at the rear of said nipple (9).
7. Electrode according to claim 1, wherein said sleeve (8) is connected to said electrical supply terminal.

* * * * *